(12) United States Patent
Rising, III et al.

(10) Patent No.: US 7,155,441 B2
(45) Date of Patent: Dec. 26, 2006

(54) FUZZY RELATIONS AND GRAPH STRUCTURES FOR COMPACT DESCRIPTION AND MODIFICATION

(75) Inventors: Hawley K. Rising, III, San Jose, CA (US); Ali Tabatabai, Beaverton, OR (US); Toby Walker, Fujisawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 232 days.

(21) Appl. No.: 09/904,174

(22) Filed: Jul. 11, 2001

(65) Prior Publication Data

US 2002/0087585 A1    Jul. 4, 2002

Related U.S. Application Data

(60) Provisional application No. 60/217,355, filed on Jul. 11, 2000.

(51) Int. Cl.
*G06F 17/30* (2006.01)

(52) U.S. Cl. .................. 707/101; 707/3; 707/104.1

(58) Field of Classification Search .................. 707/5, 707/6, 100, 101, 103, 104, 201, 3, 104.1, 707/102; 345/854; 382/305; 709/231, 232; 725/34, 46
See application file for complete search history.

(56) References Cited

U.S. PATENT DOCUMENTS

| | | | |
|---|---|---|---|
| 5,579,471 A | | 11/1996 | Barber et al. |
| 5,652,880 A | * | 7/1997 | Seagraves ............... 707/103 R |
| 5,720,005 A | * | 2/1998 | Goke et al. .................... 706/1 |
| 5,841,900 A | | 11/1998 | Rahgozar et al. |
| 6,108,676 A | | 8/2000 | Nakatsuyama |
| 6,128,606 A | | 10/2000 | Bengio et al. |
| 6,154,213 A | * | 11/2000 | Rennison et al. ............ 345/854 |
| 6,256,618 B1 | | 7/2001 | Spooner et al. |
| 6,263,335 B1 | * | 7/2001 | Paik et al. ..................... 707/5 |
| 6,317,748 B1 | * | 11/2001 | Menzies et al. ........ 707/103 X |
| 6,347,303 B1 | * | 2/2002 | Nagai et al. .................... 705/7 |
| 6,396,963 B1 | * | 5/2002 | Shaffer et al. .............. 382/305 |
| 6,492,998 B1 | | 12/2002 | Kim et al. |
| 6,564,263 B1 | * | 5/2003 | Bergman et al. ............ 709/231 |
| 6,609,118 B1 | * | 8/2003 | Khedkar et al. ............ 705/400 |
| 6,807,583 B1 | | 10/2004 | Hrischuk et al. |
| 6,847,980 B1 | * | 1/2005 | Benitez et al. ........... 707/104.1 |
| 2002/0059290 A1 | | 5/2002 | Rising, III. |
| 2002/0059584 A1 | * | 5/2002 | Ferman et al. ................. 725/34 |

OTHER PUBLICATIONS

Graph Rewrite System for Program Optimization, UWE Assmann, ACM vol. 22, No. 4, Jul. 2000, pp. 583-637.
Similarity Searching in Medical Image Databases, Petrakis, E.G.M.; Faloutsos, A., Knowledge and Data Engineering, IEEE Transactions on vol. 9, Issue 3, May-Jun. 1997, pp. 435-447.

(Continued)

*Primary Examiner*—Jean M. Corrielus
(74) *Attorney, Agent, or Firm*—Blakely, Sokoloff, Taylor & Zafman LLP

(57) ABSTRACT

A method permitting compact ways to update relationships between entities in an audiovideo sequence, or serial set of sequences, the method comprising: writing a description between the entities, the description containing relations; determining the relations that may be represented by parameters, each parameter having a numerical value; and obtaining from the user, one or more of the following: (a) the numerical value for the parameter; (b) a description of the parameter containing the numerical value; and (c) a description capable of setting the parameter dynamically.

18 Claims, 3 Drawing Sheets

As a member function updated by a graph (Semantic Description)

OTHER PUBLICATIONS

ACM Transaction on Programming Languages and Systems, vol. 16, No. 3, May 1994, pp. 493-523.

A Model for Distributed System Bases on Graph Rewriting, Journal of the Association for Computing Machinery, vol. 34, No. 2, Apr. 1987, pp. 411-449.

A Needed Narrowing Strategy, Journal of the ACM, vol. 47, No. 4, Jul. 2000, pp. 776-822.

Linear Behaviour of Term Graph Rewriting Programs, 1995 ACM, pp. 157-163.

Barendregt, 'An Intermediate Language Based on Graph Rewriting', 1988/89, pp. 163-177.

* cited by examiner

As a member function expressed in the Relation DS

As a member function expressed by a SematicStateDS

As a member function updated by a graph (Semantic Description)

FUZZY RELATIONS AND GRAPH STRUCTURES FOR COMPACT DESCRIPTION AND MODIFICATION

BACKGROUND OF THE INVENTION

The present invention relates to audio visual information systems, and more specifically to a system for describing, classifying, and retrieving audiovisual information for compact descriptions of relationships.

The amount of multimedia content available on the World Wide Web and in numerous other databases is growing out of control. However, the enthusiasm for developing multimedia content has led to increasing difficulties in managing accessing and identifying and such content mostly due to their volume. Further more, complexity and a lack of adequate indexing standards are problematic. To address this problem, MPEG-7 is being developed by the Moving Pictures Expert Group (MPEG), which is a working group of ISO/IEC. In contrast to preceding MPEG standards such as MPEG-1 and MPEG-2 which relate to coded representation of audio-visual content, MPEG-7 is directed to representing information relating to content, and not the content itself.

The MPEG-7 standard, formally called the "Multimedia Content Description Interface" seeks to to provide a rich set of standardized tools for describing multimedia content. It is the objective to provide a single standard for providing interoperable, simple and flexible solutions to the aforementioned problems vis-a-vis indexing, searching and retrieving multimedia content. Software and hardware systems for efficiently generating and interpreting MPEG-7 descriptions are being developed.

More specifically, MPEG-7 defines and standardizes the following: (1) a core set of Descriptors (Ds) for describing the various features of multimedia content; (2) Description Schemes (DSs) which are pre-defined structures of Descriptors and their relationships; and (3) a Description Definition Language (DDL) for defining Description Schemes and Descriptors.

A Descriptor (D) defines both the semantics and the syntax for representing a particular feature of audiovisual content. A feature is a distinctive characteristic of the data which is of significance to a user.

As noted, DSs are pre-defined structures of Descriptors and their relationships. Specifically, the DS sets forth the structure and semantics of the relationships between its components having either Descriptors and/or Description Schemes. To describe audiovisual content, a concept known as syntactic structure which specifies the physical and logical structure of audiovisual content is utilized.

The Description Definition Language (DDL) is the language that allows the creation of new Description Schemes and Descriptors. It also allows the extension and modification of existing Description Schemes. The DDL has to be able to express spatial, modification of existing Description Schemes. The DDL has to be able to express spatial, temporal, structural, and conceptual relationships between the elements of a DS, and between DSs.

Conventional systems have been unable to address the issue of weights for description schemes. A "weight" is a method of establishing the strength of a relationship between description schemes, representing properties or parts of a description. Disadvantageously, conventional systems place weights on entities themselves so that future changes to weights cannot be carried out in a simplified manner.

Therefore there is a need to resolve the aforementioned disadvantage and the present invention meets this need.

SUMMARY OF THE INVENTION

A method permitting compact ways to update relationships between entities in an audiovideo sequence, or serial set of sequences. The method comprises (1) writing a description between the entities, the description containing relations; (2) determining the relations that may be represented by parameters, each parameter having a numerical value; and (3) obtaining from the user, one or more of the following: (a) the numerical value for the parameter; (b) a description of the parameter containing the numerical value; and (c) a description capable of setting the parameter dynamically.

According to another aspect of the present invention, the method further comprises combining a State DS with an additional field in a GraphType DS.

According to another aspect of the present invention, combining allows a set of parameters to determine the strength of an edge, seen as a fuzzy member of the relation defined by edges on a set of vertices.

According to another aspect of the present invention, the method further comprises running, by a user, a query based on membership in the relation.

DETAILED DESCRIPTION OF THE INVENTION

Figure 1:
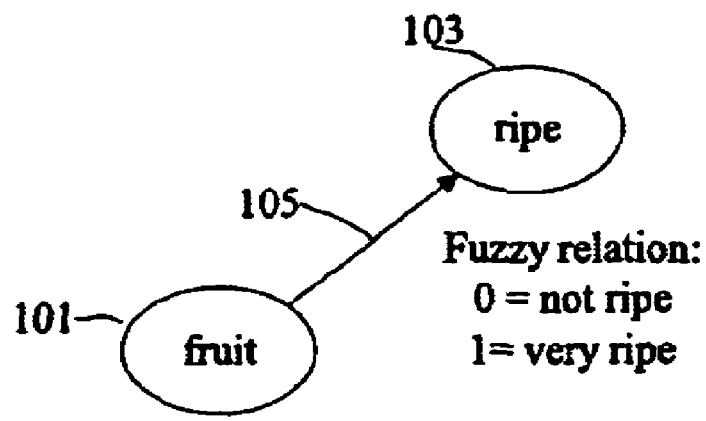
FIG. 1 is a block diagram of a technique for using the present invention.

The most concise method of offering a measure of the strength of a relationship, comes from examining the graph as a fundamental object. A graph is a set E of edges, a set V of vertices, together with a mapping $E \to V \times V$ specifying the start and end vertex for each edge. If this mapping is 1—1, then it the mapping specifies a subset of $V \times V$, if not, then it can be broken into a set of partial maps $E \to V \times V$, which form subsets of $V \times V$ each on some subset of the set of edges. If n-ary relations are examined, the proper subsets of the proper Cartesian product space may be mapped, that is, the product space of the n spaces involved in the relation.

The simplest case considered here is as follows. The form of E is a relation on the set V of vertices. As such the above mapping may be viewed as an inclusion, to produce $E \subseteq V \times V$. Giving E as a subset, allows the proper framework to evaluate measures of strength, by measuring the degree to which a particular edge is a member of E. This establishes a membership function $m_E$: $V \times V$, giving both a way of specifying strength or confidence in a relationship, and a simple mechanism for achieving it. ( ) This definition of a fuzzy relation differs from the conventional definitions which defines a relationship on the whole Cartesian product, whereas the present invention defines fuzzy relationship on a subset This is of great advantage in writing concise descriptions, since we use the lack of a relation to abbreviate the Graph written, and this is formally equivalent to the relation having the membership function value of zero. It also preserves the ability to make Boolean queries on the structure of the graph, where otherwise we are limited to complete graphs (graphs with edges between each n nodes). The definition is beneficial in parametrized membership functions below, because the parametrization function is then an implicit function.

The very simplest technique for "fuzzifying" graphs is to allow that the membership function is defined for the graph relation itself in one step. In practical terms this involves adding a weight attribute to each Edge in a graph, or Link outside a graph. The problem with this is that all of the mechanisms for updating the value of an edge in an interactive or streaming environment is now implicit. It is possible to have the calculations for the membership function be more explicit, by using the State DS.

In reality, the relation E on V×V is part of a decomposition involving entities which are represented by the vertices in V, and the various and sundry relationships in which they are involved. This decomposition maps the description on to all the relations of which any part participates. When a relationship is written in Graph DS, a relation $R \subseteq A \times B$, is being formed, after which R is mapped into E as a subset. The values which determine the membership function value in E are therefore parameters affecting the entity types A and B, and the relation R which maps into the graph.

This suggests use of a parametrized membership function. This means that if R is a fuzzy set, and x is an element, we split the mapping via a parameter space, PS, that is, defining $m_R(x)$ by defining $f: A \times B \rightarrow PS, g: PS$, and $m_R(x) = g \cdot f(x)$. How this works is that we define, the relation R, as a "relation type". In the relation type, we define the parameter function g, leaving the parametrization function $f$ to be defined implicitly when edges are defined. Suppose, for an example, that we have $g(u+v+t+w)=(u+v+t+w)/4$, u,v,t,w reals(double)constrained. Define a graph with an Edge(a,b), and a State DS with attribute-value pairs these 4 variables, and a Link to Edge(a,b) (or from Edge(a,b) if the scoping is easier).

As the AV sequence progresses through time, the values of these variables are updated and this changes the confidence in this edge. The dependencies of the membership function on parameters are expressed in the membership function declaration. Since these are attribute value pairs, it is also possible to link to the attributes in the two or more nodes participating in the relation instance. This circumstance is likely to be common, it asserts that the participants in a relation determine the level of that relation.

Figure 2:
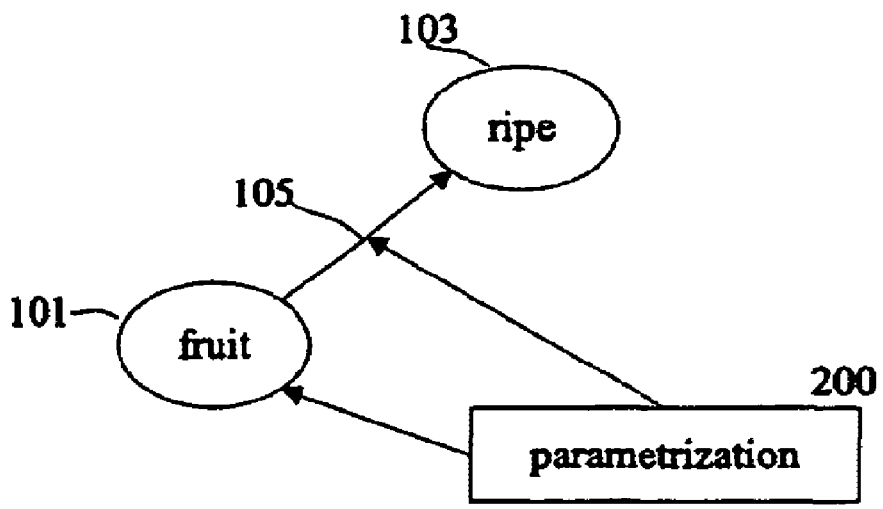
FIG. 2 is block diagram of an alternate technique for using the present invention.
Figure 3:
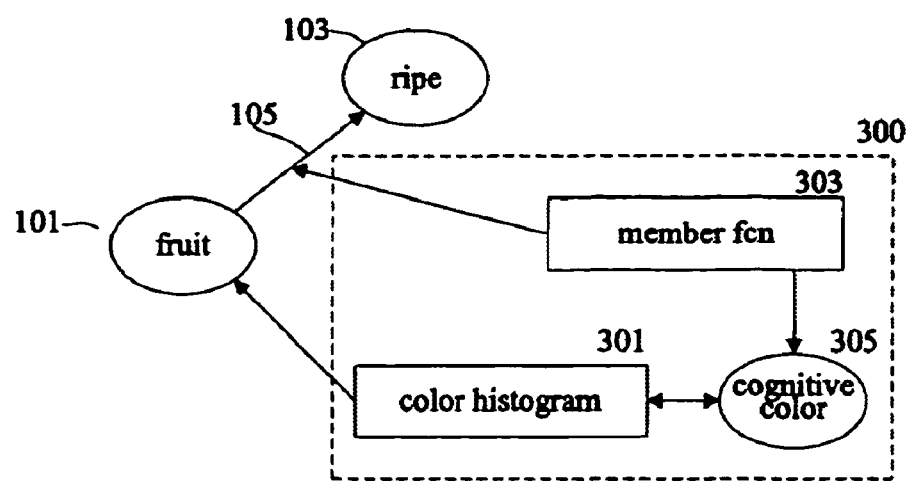
FIG. 3 is block diagram of an alternate technique for using the present invention.

The parameterized member function may be used for "running descriptions", like live feeds. As described above, an MPEG7 DescriptionScheme (DS) sets forth the structure and semantics of the relationships between Descriptors and/or DescriptionSchemes that describe the various features of multimedia content. For purposes of illustration, assume an AV sequence that shows a piece of fruit changing state from not ripe to very ripe. The DescriptionScheme for the AV sequence could define a relationship between the piece of fruit and a "ripe" attribute. In FIGS. 1–3, the relationship between the piece of fruit and the ripe attribute is illustrated as edge 105 extending between vertices (nodes) 101, 103. In order to indicate how ripe the fruit is at any point in the AV sequence, the present invention adds a parameter to the description of the relationship 105 that expresses the confidence or strength of the membership of the piece of fruit in the relationship. A parameter of zero indicates the fruit is not ripe and thus is not a member. A parameter of one indicates the fruit is very ripe and thus is fully a member. When the fruit is between "not ripe" and "very ripe," the fruit's membership in relationship 105 is considered "fuzzy" and is expressed by parameter values between zero and one.

FIG. 1 is a block diagram of a technique for using the present invention. In FIG. 1, a member function expressed in the Relation DS is shown. The parameter for the relationship is set to a value from zero to one depending on the ripeness of the fruit.

FIG. 2 is a block diagram of an alternate technique for using the present invention. In FIG. 2, a member function expressed by a SemanticStateDS is shown. As described above, the parameter for the membership function may be one that affects the entities in the relationship. Thus, the ripeness of the fruit could be described in terms of its changing color. Assuming parameterization 200 describes the color of the fruit 101 as a value from zero to one, the confidence of the relationship 105 is the same value as the color value, The choice of which description of the fruit to use as parameterization 200 may be made by a user.

FIG. 3 is a block diagram of another alternate technique of using the present invention. As in FIG. 2, the state of the relationship 105 changes as the color changes but FIG. 3 illustrates a more complicated parameterization description 300. A color histogram 301 is created from the various colors of the fruit as it ripens. Cognitive color 305 determines which colors in the color histogram 301 are perceivable by a human. A member function (fcn) 303 causes the state of the relationship 105 to vary from zero to one based on the perceivable color of the fruit. Thus, the state of the relationship 105 is dynamically determined by the interactions of the elements of description 300.

Figure 4:
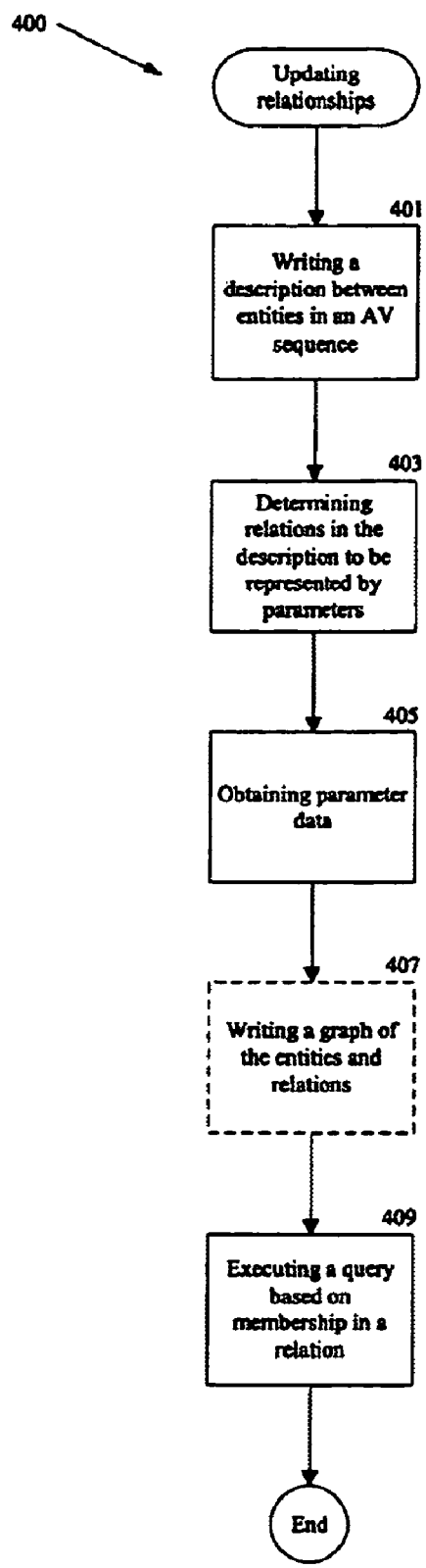
FIG. 4 is a flowchart for a method that updates relationships between entities in an AV sequence.

FIG. 4 is a flowchart for a method 400 that updates relationships between entities in an AV sequence. At block 401, a description is written containing relations that describe the relationships between the entities. At block 403, it is determined which relations may be represented by parameters having a numeric values, i.e., which relationships may be "fuzzy." At block 405, the data for the parameters is obtained from the user. The data may be a numeric value for a parameter, such as described for FIG. 1, a description of the parameter containing a numeric value for a parameter, such as parameterization 200 in FIG. 2, or a description capable of setting a parameter dynamically, such as description 300 in FIG. 3. Optionally, at block 407, a graph having a set E of edges representing the relations and a set V of vertices (nodes) representing the entities may be written as described above. Also as described above, an edge is not written when the parameter for a fuzzy relation is zero. The user may input a query based on the membership of the entities in the relationship, which is executed at block 409.

Concretely, define each as the "temperature" of 4 romantic relationships a certain unfaithful husband in the soap opera "The Coming Storm" is engaged in. Let Edge1 (a,b) be an edge in the graph of the relations between all characters in "The Coming Storm", a is the husband, b is his wife, and Edge1 is an element of the relation (i.e. an instance of the relation type) "isn't honest with". The state is the only element in this simple scenario that needs to be updated to give soap opera fans who missed the show a rundown on how the main marriage in "The Coming Storm" is doing.

---

Syntax:
The following gets added to GraphType.
<complexType name=MemberFunction>
    <attribute name="id" type="ID" use="optional" />

-continued

```
<attribute name="parameter" type="AttributeValuePair"
 minOccurs="0" maxOccurs="unbounded" />
<attribute name="functionType" type="ControlledTerm" />
</complexType>
```

Therefore, the present invention uses the State DS combined with an additional field in GraphType that allows a set of parameters to determine the strength of an edge, seen as a fuzzy member of the relation defined by edges on the set of vertices. This is shown to allow compact ways to update relationships between entities in an audiovideo sequence, or serial set of sequences.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A computerized method executable by an audio visual information system, the method comprising:
    writing a data structure representing a description scheme for a multimedia sequence to a data store for subsequently querying the multimedia sequence, the description scheme containing relations corresponding to relationships between entities in the multimedia sequence, wherein the data structure comprises a graph having a set of vertices representing the entities and a set of edges representing the relations;
    determining the relations for representation by parameters to define fuzzy relationships, each parameter having numerical values representing confidence in the corresponding fuzzy relationship;
    obtaining at least one of
        a numerical value for each parameter,
        a description of the parameter containing a numerical value, and
        a description capable of setting the parameter dynamically; and
    modifying the numerical values representing the confidence in response to changes in the parameter as the multimedia sequence progresses, the numerical values calculated using a membership function $m_R(x)=g \circ f(x)$, where R is the set of edges over the set of vertices A×B, g defines a function for the parameter over a parameter space PS, and $f$ is a parameterization function $f$: A×B→ PS, g: PS.

2. The method of claim 1 further comprising:
    combining an MPEG7 State DS (description scheme) with an additional field in an MPEG7 GraphType DS.

3. The method of claim 1 further comprising:
    running, by a user, a query on the data structure based on membership of an entity in one of the relations.

4. A computer-readable medium having executable instructions to cause a computer to perform a method comprising:
    writing a data structure representing a description scheme for a audio visual sequence to a data store for subsequently querying the audio visual sequence, the description scheme containing relations corresponding to relationships between entities in the audio visual sequence, wherein the data structure comprises a graph having a set of vertices representing the entities and a set of edges representing the relations;
    determining the relations for representation by parameters to define fuzzy relationships, each parameter having numerical values representing confidence in the corresponding fuzzy relationship;
    obtaining for each parameter at least one of
        a numerical value,
        a description of the parameter containing a numerical value, and
        a description capable of setting the parameter dynamically; and
    modifying the numerical values representing the confidence in response to changes in the parameter as the multimedia sequence progresses, the numerical values calculated using a membership function $m_R(x)=g \circ f(x)$, where R is the set of edges over the set of vertices A×B, g defines a function for the parameter over a parameter space PS, and $f$ is a parameterization function $f$: A×B→ PS, g: PS.

5. The computer-readable medium of claim 4, wherein the method further comprises:
    combining an MPEG7 State DS (description scheme) with an additional field in an MPEG7 GraphType DS.

6. The computer-readable medium of claim 4, wherein the method further comprises:
    performing a query on the data structure based on membership of an entity in one of the relations.

7. A computerized method executable by an audio video information system, the method comprising:
    deriving a confidence value for a fuzzy relation from a parameter associated with one of a plurality of description schemes in a content description representing a multimedia sequence, the confidence value representing a degree to which the fuzzy relation is a member of a subset of relations among the description schemes;
    associating the description schemes with a set of vertices in a graph and the subset of relations with a set of edges among the set of vertices, wherein the graph is written to a data store for subsequently querying the multimedia sequence; and
    modifying the confidence value in response to changes in the parameter as the multimedia sequence progresses, the confidence value calculated using a membership function $m_R(x)=g \circ f(x)$, where R is the set of edges over the set of vertices A×B, g defines a function for the parameter over a parameter space PS, and $f$ is a parameterization function $f$: A×B→ PS, g: PS;.

8. The method of claim 7, wherein the parameter is an attribute value.

9. The method of claim 7, wherein the confidence value is further derived from a set of parameters associated with the description schemes.

10. The method of claim 7, wherein the description schemes represent entities in the multimedia sequence, the fuzzy relation represents a relationship between the entities, and the confidence value represents a state of the relationship.

11. The method of claim 10, wherein the state of the relationship is described by a state description scheme that specifies the parameter.

12. The method of claim 7 further comprising:
    writing the graph without the edge representing the fuzzy relation if the confidence value is zero.

13. A computer-readable medium having executable instruction to cause a computer to perform a method comprising:
    deriving a confidence value for a fuzzy relation between description schemes from a parameter associated with one of the description schemes, the confidence value representing a degree to which the fuzzy relation is a member of a subset of relations among the description schemes in a content description representing a multimedia sequence;

associating the description schemes with a set of vertices in a graph and the subset of relations with a set of edges among the set of vertices, wherein the graph is written to a data store for subsequently querying the multimedia sequence; and modifying the confidence value in response to changes in the parameter as the multimedia sequence progresses, the confidence value calculated using a membership function $m_R(x)=g \circ f(x)$, where R is the set of edges over the set of vertices A×B, g defines a function for the parameter over a parameter space PS, and $f$ is a parameterization function $f: A \times B \rightarrow PS$, g: PS.

14. The computer-readable medium of claim 13, wherein the parameter is an attribute value.

15. The computer-readable medium of claim 13, wherein the confidence value is further derived from a set of parameters associated with the description schemes.

16. The computer-readable medium of claim 13, wherein the description schemes represent entities in the multimedia sequence, the fuzzy relation represents a relationship between the entities, and the confidence value represents a state of the relationship.

17. The computer-readable medium of claim 16, wherein the state of the relationship is described by a state description scheme that specifies the parameter.

18. The computer-readable medium of claim 13, wherein the method further comprises:

writing the graph without the edge representing the fuzzy relation if the confidence value is zero.

* * * * *